April 26, 1938.  A. HOFFELD  2,115,107
CORN SILKER AND CLEANER
Filed June 29, 1935  3 Sheets-Sheet 1

Inventor
Alfred Hoffeld
By
Attorney

April 26, 1938.  A. HOFFELD  2,115,107
CORN SILKER AND CLEANER
Filed June 29, 1935   3 Sheets-Sheet 3

Inventor
Alfred Hoffeld
By Graham
Attorney

Patented Apr. 26, 1938

2,115,107

UNITED STATES PATENT OFFICE 2,115,107

CORN SILKER AND CLEANER

Alfred Hoffeld, Hoopeston, Ill., assignor to Food Machinery Corporation, San Jose, Calif., a corporation of Delaware Application June 29, 1935, Serial No. 29,120

5 Claims. (Cl. 209—12)

This invention relates to an improved apparatus and method of cleaning small grains and the like and is particularly adapted to the cleaning and silking of whole grain cut green corn during its preparation for canning.

Whole grain corn as known to the art comprises the whole kernels, or substantially the whole kernels cut from the cobs and canned as whole kernels.

In the commercial cutting of whole grain corn for canning more or less of the silk, husks, pieces of cobs and other debris are accumulated with the corn as it falls from the cutters and before sending the cut kernels along the line to the processing machines it is necessary to clean this debris from the mass of cut kernels in order to have a clean and sanitary pack.

These cut kernels have been cleaned in the past by running them through a washing tank and immersing them in a suitable washing solution, the pieces of silk, cobs, husks and other debris usually floating on the surface of the liquid and then skimmed off either mechanically or by hand.

This method of cleaning is known as the immersion or flotation system and cleans the corn in a very satisfactory manner as far as removing the most of the debris therefrom is concerned, but occasionally some of the cut kernels float with the debris and are skimmed off with the debris and thus lost to the canner.

A more serious objection to the flotation method resides, however, in the leaching out of the corn juices and contents of the kernels through the cut surfaces occasioned by cutting the kernels from the cobs, with the result that the product after having passed through a flotation cleaning operation comes out more or less depleted in food elements that are lost in the cleaning solution.

The method involved in this invention contemplates the cleaning of the cut kernels by a blast of air projected onto them as they fall by gravity through a predetermined path. Just back of the falling kernels is an open mesh conveyor member moving in the opposite direction to that of the falling kernels, which intercepts and catches the silks, small pieces of husks and the like and carries them up and discharges them on the back run, while the heavier debris such as cobs and the like fall down the conveyor but owing to being heavier than the kernels of corn are deflected less than the corn and therefore fall in a waste box placed for the purpose.

Practically all of the debris however, is blown against the moving conveyor, some of which like the small pieces of silk and husks are blown right through the conveyor and fall into a waste box placed to receive this material, while larger pieces of silk and husks as well as skins etc., are held against the conveyor by the air blast and are thereby carried up and over the top and discharged on the down run of the conveyor. A rotating brush is placed in contact with the conveyor to clean this accumulated material therefrom as the conveyor is moving.

Aside from the improved cleaning effected by this method the kernels of corn are somewhat improved for canning purposes because the air blast tends to dry the extruding juices and pulp and thus prevents to some extent what is called bleeding of the cut kernels.

This method also brings about a considerable saving in lost corn since all of the kernels passing through the machine are saved for canning, while as has been mentioned many kernels are lost in the flotation method because of their floating with the debris and are thus skimmed off with the debris and lost to the canner.

Another feature of importance in this method is that owing to the construction and arrangement of the screen conveyor and the point of discharge from the hopper the kernels start their fall by unimpeded gravity but as they advance along the conveyor screen their fall is retarded to give a longer time action in the air blast and thus give the maximum of cleaning effect for all size and weight kernels.

It is therefore an object of the invention to provide an apparatus for cleaning whole grain corn for canning purposes that will most effectively remove accumulated debris from the mass of cut kernels.

It is a further object of the invention to provide a machine for the purpose specified that will clean accumulated debris from a mass of cut kernels by subjecting the kernels to an air blast.

It is a further object of the invention to provide a machine for cleaning debris from whole grain corn by means of an air blast in combination with a traveling screen.

It is also an object of the invention to clean debris from whole grain corn wherein the corn is allowed to fall by gravity and to move a screen member adjacent the falling corn to gather and convey the accumulated debris away from the falling corn.

It is also an object of the invention to clean whole grain corn by letting the mass of corn fall through a predetermined path by gravity and to move a screen member adjacent the stream of falling corn in the opposite direction to that of the corn to gather the debris accumulated by the screen and convey it away from the stream of corn.

It is a further object of the invention to clean whole grain corn or like material by permitting the corn to fall in a continuous stream through a predetermined path and to move a screen member adjacent the falling corn, in the opposite direction to that of the falling corn and to project an air blast against the stream of corn to blow the debris from the stream of corn onto the screen member whereby the debris is accumulated by the screen member and carried away.

It is also an object of the invention to clean whole grain corn by means of an air blast directed against a stream of corn and retarding the movement of the corn to give the maximum treating time to the stream.

With such objects in view as well as other advantages inherent in the invention it is to be understood that applicant believes himself entitled to such changes and modifications from the shown and described method and apparatus as come within the scope and meaning of the claims hereto appended. In the accompanying drawings the preferred manner of applying the principles of the invention have been shown, wherein the several parts and combinations constituting the invention are shown in their proper operative relation. The drawings are not necessarily made to scale and some of the parts may be exaggerated relative to other parts to aid in illustrating the invention clearly.

Reference now being had to the drawings, a better and clearer understanding of the invention and its application to a commercial machine will be had.

Figure 1:
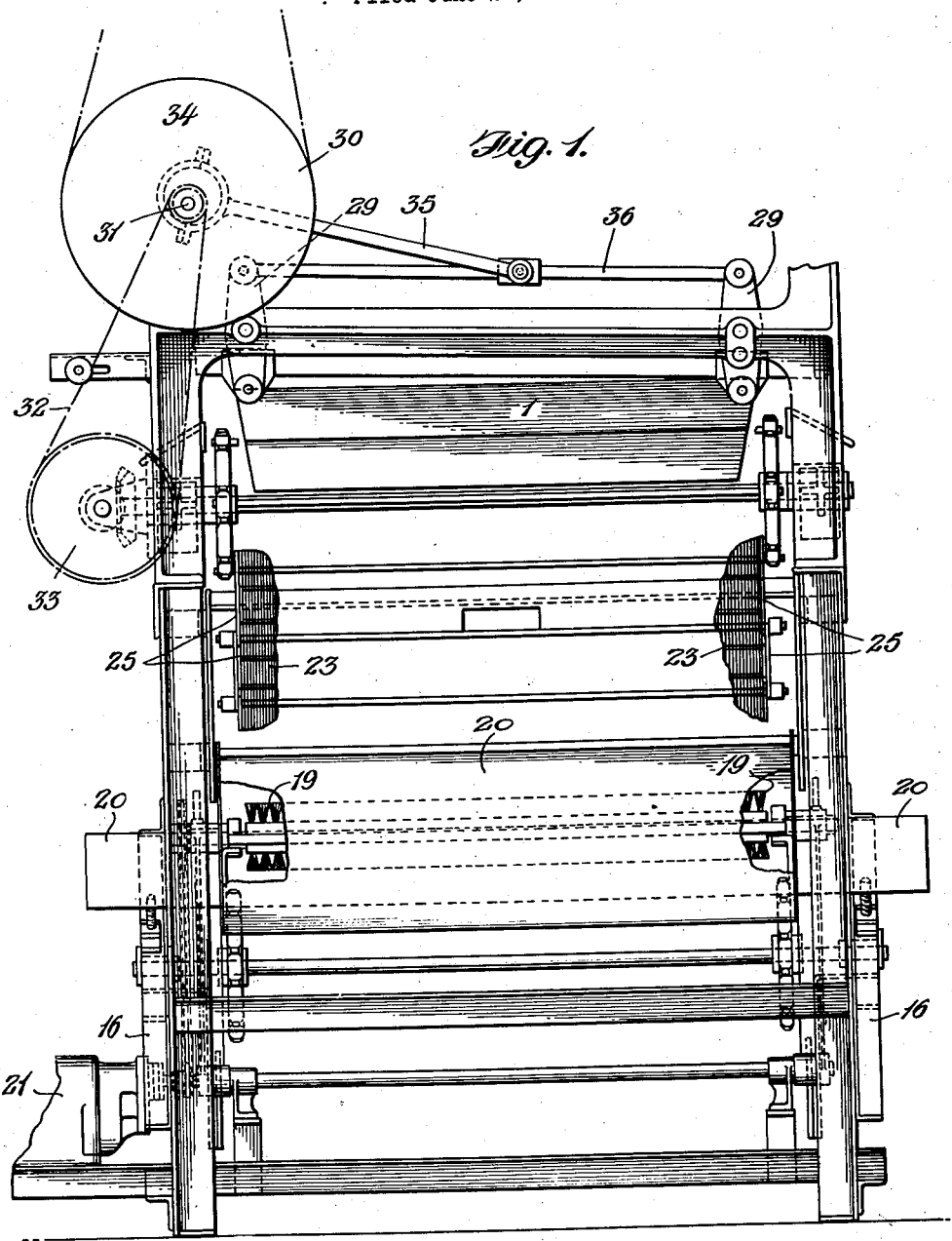
Figure 1 is a front elevation of the machine looking from the left of Figure 2 but with the fans and some of the structure eliminated to clearly show the structure beyond.

The numeral 1 indicated a hopper into which the whole grain kernels are deposited from a chute 2 or from any other source. 3 is the screen conveyor member supported on the sprockets 4 and 5 and driven in the direction of the arrows by the gears 6 and 7 and the shaft 8 which is driven from a suitable source of power. 9 and 10 indicate two fans positioned in front of the screen conveyor member 3, each driven by an independent motor as shown, the motors being 11 and 12. The motors 11 and 12 being mounted on a swinging hanger 13 which extends across the front side of the machine, being pivoted to the framework at 14 and clamped in the desired angular position by the clamp bolt 15. This adjustment permits of placing the fans 9 and 10 in any desired angle relative to the screen conveyor 3.

The screen conveyor 3 is also adjustable angularly by means of the tie bars 16 secured to the sides of the framework by the bolts 17. Additional holes 18 in the tie bars permitting other adjustments. By this adjusting the fans and the lower end of the screen member 3 any desired relation between the fans and screen member may be had.

At the back of the screen member 3 is the cleaning brush 19, mounted in the housing 20 and driven by a suitable connection with the reduction motor 21. The housing 20 extends down to the motor 21 and swings on the hub thereof and is clamped in the desired position relative to the back run of the screen conveyor 3 by means of the bolt 22, thus the brush 19 may be kept in proper contact with the conveyor 3 in any adjustment thereof.

The screen conveyor is made up of rods 23 secured to the spreader members 24 which are in turn secured to the side links 25 which together form the conveyor and screen surface. The conveyor is substantially a link belt and operates on the supporting sprockets 4 and 5 the same as any link belt.

Figure 2:
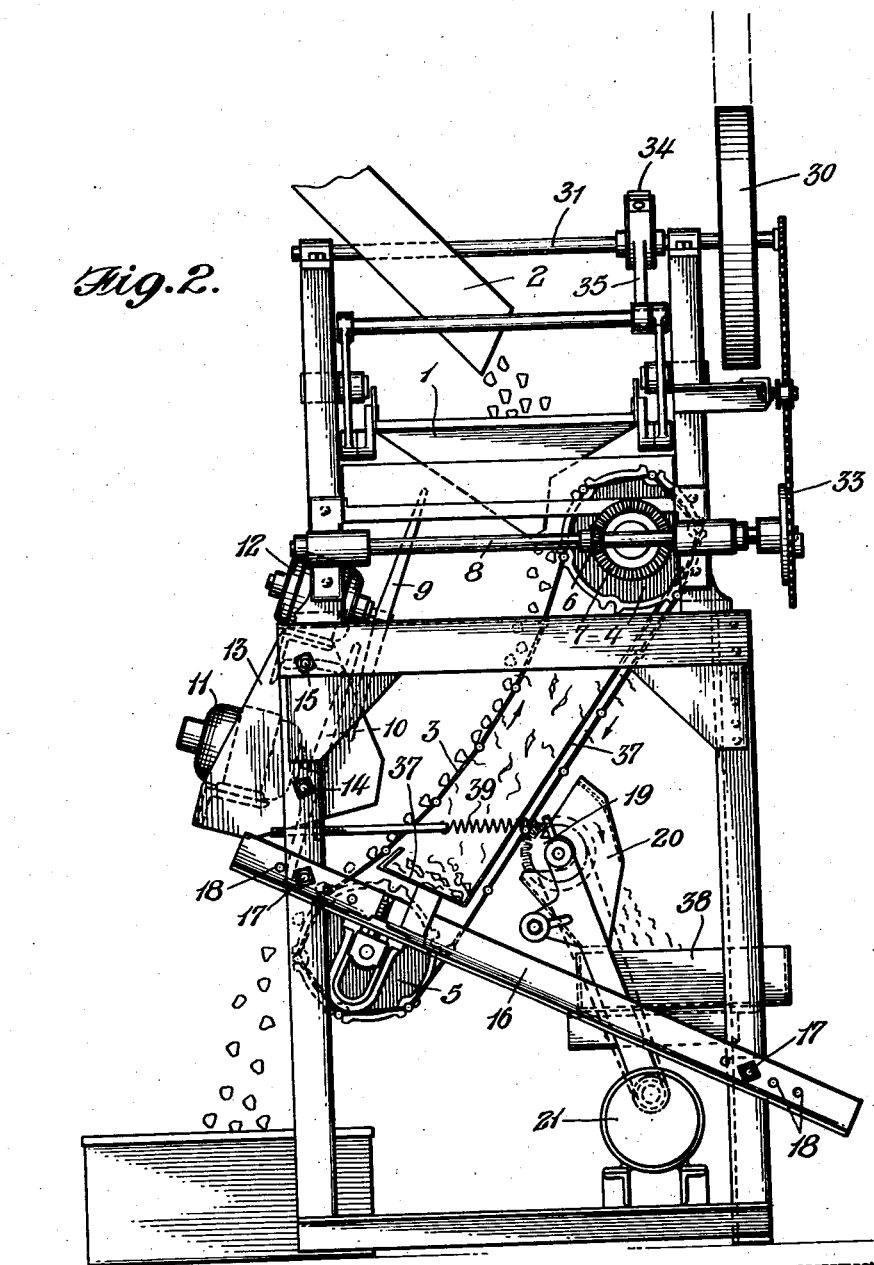
Figure 2 is a side elevation of the machine with all of the operative parts in their proper relative positions.
Figure 3:
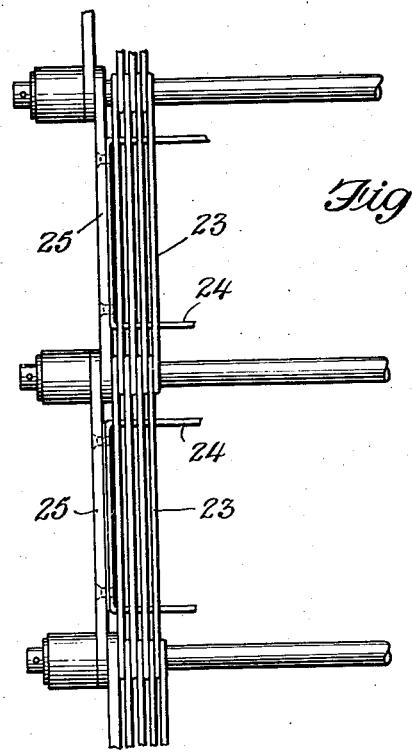
Figure 3 is a detail elevation of a portion of the screen conveyor member showing the construction of the bars to form the screen.
Figure 4:
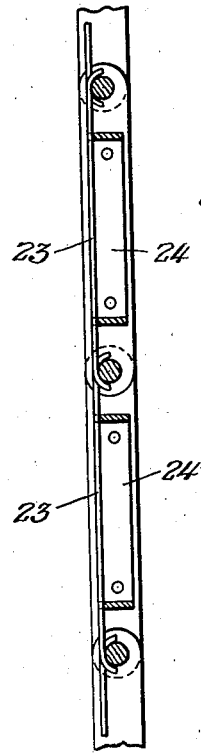
Figure 4 is a side elevation of Figure 3.
Figure 5:
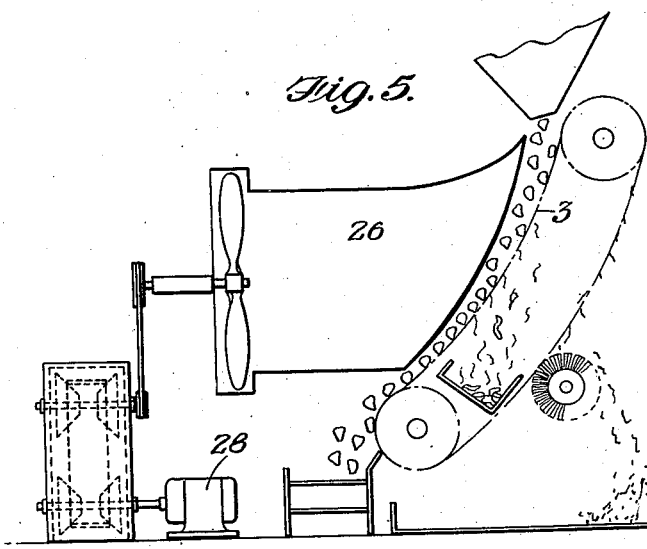
Figure 5 is a diagrammatic view showing a modification of the air blast arrangement relative to the screen conveyor.

Figure 5 shows a modification of the arrangement shown in Figure 2 in that a funnel 26 confines the air blast and by tilting the fan structure in the manner described for Figure 2 the blast can more certainly be directed in just the manner desired. Then too the fan in this arrangement is driven with a variable speed device so that its operation can be more easily controlled and speeded up or down according to the requirements of the product being handled. The variable speed device is indicated at 27 which is shown only diagrammatically to show its relation to the fan and motor 28. In Figure 5 the motor 28 is shown setting on the floor but it is clearly evident that the motor and the variable speed device 27 can be readily mounted on a suitable hanger such as 13 in Figure 2 which will then have the motor, the fan and the variable speed device all on a swinging mounting so the fan and funnel may be tilted in any desired position relative to the conveyor 3.

The hopper 1 is mounted on the rocker arms 29 so that it may be vibrated and thus distribute the discharge of the corn kernels evenly and uniformly over the extent of the screen conveyor.

*Operation*

The endless screen conveyor is driven from a suitable pulley 30 mounted on the drive shaft 31 through the chain 32 to the sprocket 33 on the shaft 8. The hopper 1 is vibrated by means of an eccentric 34 on the shaft 31 and the connecting rod 35 connecting with the tie rod 36 connected with the rockers 29.

The stream of cut corn being directed to the top of the conveyor 3 by means of the chute 2 and the conveyor being vibrated by the mechanism just described the corn will dribble down onto the upper end of the conveyor at the top of Figure 2. The motors 11 and 12 being in operation will rotate the fans 9 and 10 and cause a blast of air to envelop the conveyor and tend to hold the material falling from the hopper 1 tight against the conveyor, leaving only the rounded kernels free to tumble down the incline of the front face of the conveyor. The conveyor being made up of round bars as has been described with spaces between the blast of air will blow silks, small pieces of husks and other light and small debris through the interstices where they will be caught in the waste receptacle 37 and those small pieces of debris that do not go through the screen will adhere to the surface thereof and be carried over the top and down the back when they too will land in the receptacle 37. Those pieces of silks and other debris that do not fall off naturally will be brushed off by the revolving brush 19 and deposited in the waste receptacle 38, thereby the front surface of the conveyor is continually cleaned and always presents a clean face to the falling material.

The fans will blow a continuous blast of air against the conveyor and will intercept all the falling material, and the inclination of the conveyor will tend to retard the fall of the material, as well as its direction of travel which is upward just the opposite to the falling material, therefor. the material will be subjected to the cleaning action of the air stream for a maximum time and still permit the machine to deliver a good capacity.

The fans 9 and 10 and the motors 11 and 12 being mounted on the hanger 13 as has been described, permit of adjustment relative to the conveyor so that the air blast may be projected in any direction angularly thereto, to produce the most desirable result and efficiency. The conveyor 3 also being angularly adjustable as has been described will further add to the ability and efficiency of the machine to produce a satisfactory job of cleaning.

In whatever adjustment the conveyor may be placed the final clamping of the tie bars 16 will hold the new setting rigidly and secure.

The brush 19 is yieldingly held against the back run of the conveyor 3 by means of a tension spring 39. The hand wheel 22 can be made to clamp the bracket 20 solidly if desired or it may be loosened and permit the spring 39 to hold the brush against the conveyor with a yielding pressure.

Due to the dry cleaning method here involved it has been found in practice that a considerable saving in corn and a much improved product in flavor is obtained because none of the kernel juices and starch is lost as is the case with the flotation method which tends to leach out the juices and soft portions of the kernels. The air blast driving forcibly against the falling corn tends to dry up the cut area and seal the kernel contents so that there is no further bleeding of the kernels in the subsequent operations in the preparation of the corn for canning.

What I claim as new and desire to secure by Letters Patent is:

1. An apparatus for cleaning and removing pieces of cobs, silks and husks from fresh cut whole grain corn or like material, comprising and inclined conveyor having openings therein elongated in the direction of travel of said conveyor and means for moving the front run of said conveyor in an upward direction, blowers means for projecting a column of air against the front run of said conveyor, means for changing the angular direction of said column of air relative to said conveyor, means for discharging material to be treated and cleaned near the top portion of said conveyor so that it will fall downward along the front run of said conveyor and intercept said column of air whereby some of the material to be cleaned from the cut corn will be blown against said conveyor and adhere thereto and be conveyed upward from said treating area, and other of said material will be blown through said elongated openings in said conveyor, with separate means for receiving said falling treated and cleaned whole grain corn and the waste matter removed therefrom.

2. An apparatus for cleaning and removing pieces of cobs, silk and husks and other waste material from a continuously moving stream of freshly cut whole grain corn or like material, comprising an endless conveyor mounted to move in an upwardly inclined direction, the surface of said conveyor being perforated with openings elongated in the direction of travel of said conveyor, and means for moving said conveyor, blower means for projecting an air blast against the forward run of said conveyor, means for changing the angular direction of said air blast relative to said conveyor, means for discharging the freshly cut whole grain corn and the waste matter contained therewith near the top portion of the front run of said conveyor so that it will fall downward along the upwardly inclined surface thereof and intercept the said air blast whereby some of the waste material will be blown against the front surface of said conveyor and be carried upward and around the top thereof and discharged from the back thereof while other of the waste material will be blown through the elongated openings in the conveyor and be accumulated for further disposal with receptacles for receiving the cleaned whole grain corn and the waste matter removed therefrom.

3. An apparatus for removing pieces of cobs, silks and husks from a mass of freshly cut whole grain corn or the like comprising an endless conveyor having elongated perforations therein positioned in the direction of travel of the conveyor, means for mounting said conveyor in an inclined position and means for moving said conveyor so the front run thereof will move up the said incline through a curvilinear path the upper end of said inclined curvilinear path being more vertical than the lower part of said path, means for discharging a mass of mixed waste matter and freshly cut whole grain corn at the top of said incline where said material will fall with slight retardation from the inclination of said conveyor and will meet added retardation as it reaches the lower end of the incline, means positioned in front of said upper run of said conveyor to project an air blast thereagainst to intercept the falling material to blow some of the waste matter against the conveyor where it will adhere and to blow other of the waste material through the openings in said conveyor, the entire waste matter being accumulated back of the front run of said conveyor and the whole grain cut corn will fall uninterrupted into a suitable receptacle entirely separated from the waste material.

4. An apparatus for cleaning and drying fresh cut whole grain corn or the like comprising an endless conveyor inclined so the front run will move up the incline and having openings elongated in the direction of the movement of the conveyor, means for depositing a mass of fresh corn and associated waste matter adjacent the top of the upwardly moving conveyor so it will fall downward therealong, means for projecting an air blast against the front run of said elevator to intercept said falling material to blow the waste matter therefrom and to contact with the cut corn and dry the same to retard bleeding of the cut kernels, the waste matter blown from the mass either depositing on said coveyor and being elevated and discharged thereby or blowing entirely through the conveyor and being collected in the back thereof for further disposal and separate receiving means for the cleaned corn and the waste matter.

5. An apparatus for separating waste material from whole kernels of corn or the like, comprising a steeply inclined perforated conveyor with its upper stretch having an outwardly concave curvilinear path of movement, means for driving said conveyor to move the upper stretch thereof upwardly, means for projecting a column of air against the upper stretch of said conveyor, the upper edge of said air column being substantially in line with the axis of turning of the upper end of the conveyor, and means for discharging material to be separated into said air column at the upper edge thereof and spaced from said conveyor to provide for initial free falling movement of said material.

ALFRED HOFFELD.